United States Patent
North et al.

(10) Patent No.: US 11,613,349 B2
(45) Date of Patent: *Mar. 28, 2023

(54) VERTICAL TAKE OFF AND LANDING (VTOL) AIRCRAFT WITH VECTORED THRUST HAVING CONTINUOUSLY VARIABLE PITCH ATTITUDE IN HOVER

(71) Applicant: UNITED STATES OF AMERICA AS REPRESENTED BY THE ADMINISTRATOR OF NASA, Washington, DC (US)

(72) Inventors: David D. North, Williamsburg, VA (US); Michael P. Hendrickson, Hampton, VA (US); Joshua C. Glaab, Hampton, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/329,853

(22) Filed: May 25, 2021

(65) Prior Publication Data

US 2021/0276709 A1    Sep. 9, 2021

Related U.S. Application Data

(63) Continuation of application No. 16/107,060, filed on Aug. 21, 2018, now Pat. No. 11,014,664.

(60) Provisional application No. 62/548,546, filed on Aug. 22, 2017.

(51) Int. Cl.
*B64C 29/00* (2006.01)
*B64C 11/46* (2006.01)
*B64C 11/48* (2006.01)

(52) U.S. Cl.
CPC .......... *B64C 29/0033* (2013.01); *B64C 11/46* (2013.01); *B64C 29/0075* (2013.01); *B64C 11/48* (2013.01)

(58) Field of Classification Search
CPC ............ B64C 29/0008; B64C 29/0016; B64C 29/0033; B64C 29/0075
See application file for complete search history.

(56) References Cited

U.S. PATENT DOCUMENTS

| | | | |
|---|---|---|---|
| 4,537,372 A * | 8/1985 | Forizs | B64C 29/0033 244/66 |
| 9,475,579 B2 | 10/2016 | Fredericks et al. | |
| 2017/0088291 A1* | 3/2017 | Hesse | B64C 29/0033 |

(Continued)

*Primary Examiner* — Richard G Davis
(74) *Attorney, Agent, or Firm* — Shawn P. Gorman; Robin W. Edwards

(57) ABSTRACT

The presently disclosed embodiments relate to vertical takeoff and landing (VTOL) aircraft that have the capability of hovering in both a "nose forward" and a "nose up" orientation, and any orientation between those two. The disclosed aircraft can also transition into wing born (non-hovering) flight from any of the hovering orientations. In addition, certain of the disclosed embodiments can, if desired, use only vectored thrust control to maintain stable flight in both hover and forward flight. No control surfaces (e.g. ailerons, elevators, rudders, flaps) are required to maintain a stable vehicle attitude. However, the disclosure contemplates aircraft both with and without such control surfaces.

9 Claims, 9 Drawing Sheets

(56) References Cited

U.S. PATENT DOCUMENTS

| | | | |
|---|---|---|---|
| 2018/0208305 A1* | 7/2018 | Lloyd | B60L 50/90 |
| 2019/0100303 A1* | 4/2019 | Campbell | B64C 27/26 |
| 2020/0156780 A1* | 5/2020 | Varigas | B64C 25/04 |

* cited by examiner

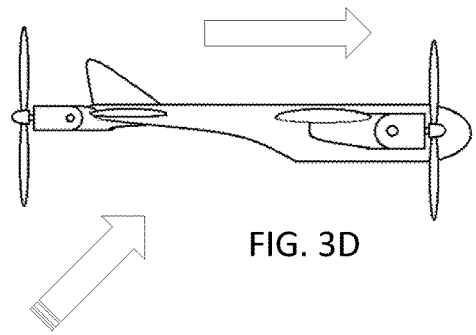
FIG. 3D
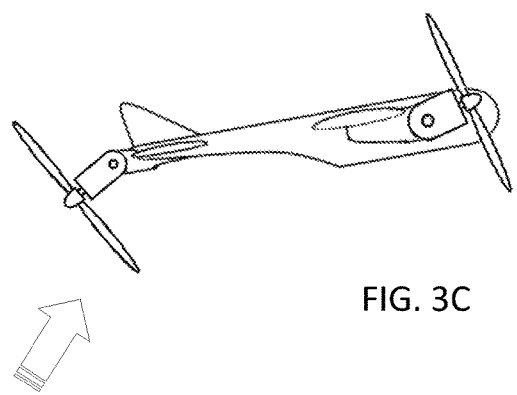
FIG. 3C
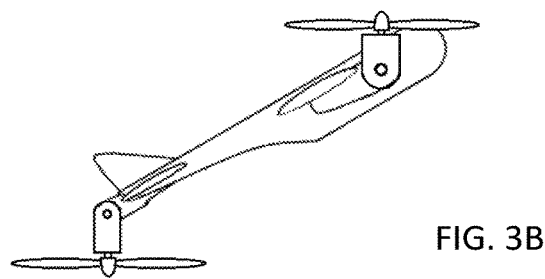
FIG. 3B
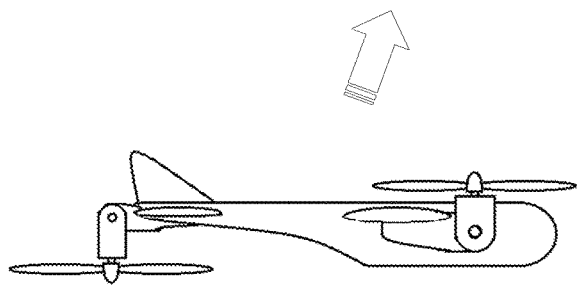
FIG. 3A

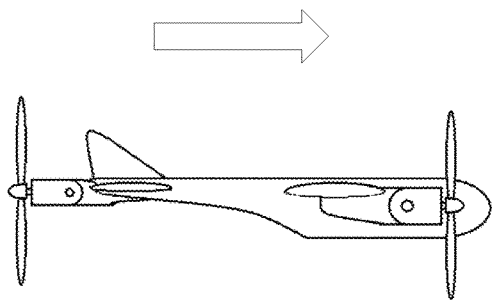
FIG. 4A
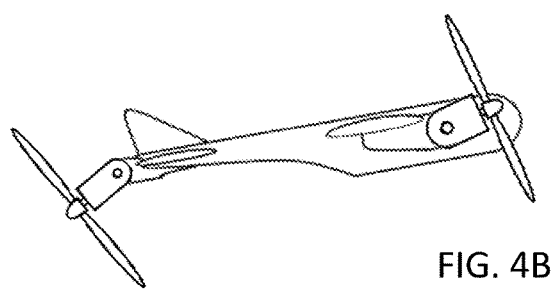
FIG. 4B
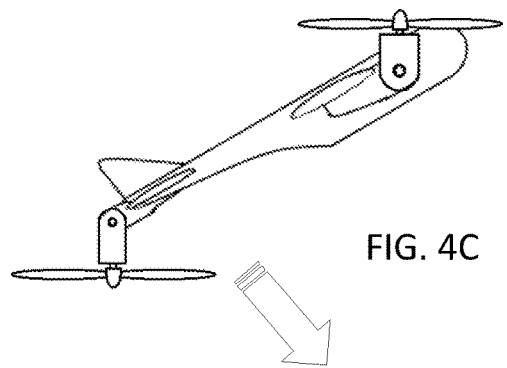
FIG. 4C
FIG. 4D
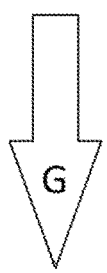

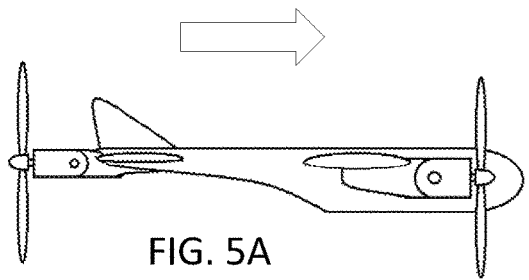
FIG. 5A
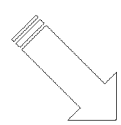
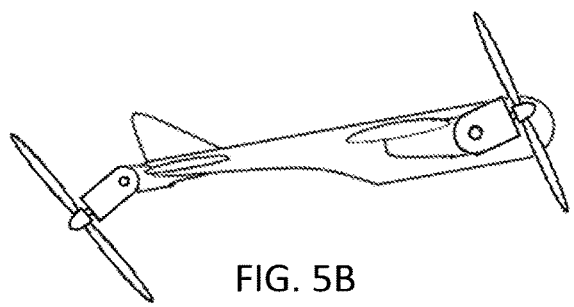
FIG. 5B
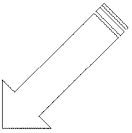
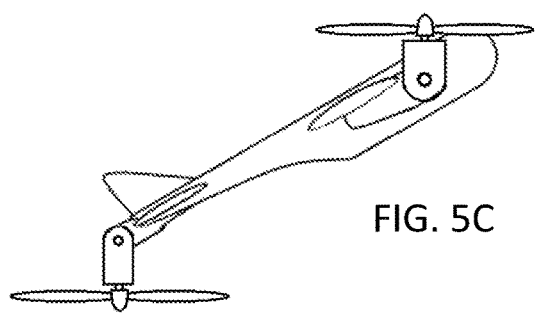
FIG. 5C
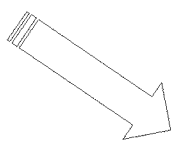
FIG. 5D
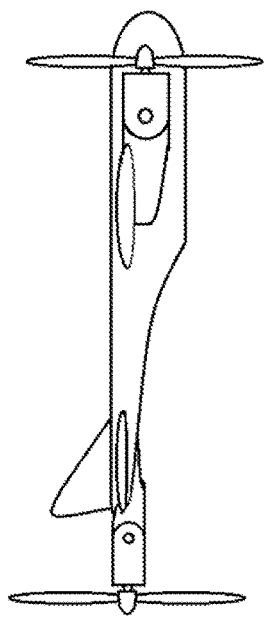
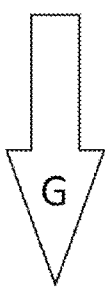

VERTICAL TAKE OFF AND LANDING (VTOL) AIRCRAFT WITH VECTORED THRUST HAVING CONTINUOUSLY VARIABLE PITCH ATTITUDE IN HOVER

CROSS-REFERENCE TO RELATED PATENT APPLICATION(S)

This patent application is a continuation of and claims the benefit of priority to U.S. patent application Ser. No. 16/107,060, titled "Vertical Take Off and Landing (VTOL) Aircraft with Vectored Thrust Having Continuously Variable Pitch Attitude in Hover" filed Aug. 21, 2018, which claims the benefit of priority to U.S. Provisional Application No. 62/548,546, titled "Vertical Take Off and Landing (VTOL) Aircraft with Vectored Thrust for Control and Continuously Variable Pitch Attitude in Hover" filed on Aug. 22, 2017, the contents of which are hereby incorporated by reference in their entirety for any purpose whatsoever.

STATEMENT REGARDING FEDERALLY SPONSORED RESEARCH OR DEVELOPMENT

The invention described herein was made in the performance of work under a NASA contract and by an employee of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND

Vertical Take Off and Landing (VTOL) flight vehicles have been in existence for many decades. However, maintaining stable flight during all modes of flight including hover, transition, and forward flight has always been a challenge. The original flight controllers for VTOL aircraft had mechanical inertial gyroscope sensors to determine vehicle attitude. To date, VTOLs have fallen into two main categories; tailsitters, where the orientation of the aircraft changes 90 degrees when transitioning from hover to forward flight, or non-tailsitters, where the orientation is the same during hover and forward flight. The present disclosure provides improvements over the state of the art.

BRIEF SUMMARY

The present disclosure is directed to embodiments of aircraft that can continuously adjust pitch, and if desired, roll and yaw. The disclosed embodiments allow for two or more orientations of a VTOL aircraft in hover mode and also allow outbound and inbound transitions from wing-born forward flight into any hover orientation between nose-up and nose-forward. Multiple hovering orientations of a VTOL vehicle will allow pointing of an instrument, matching of vehicle orientation to landing terrain or an oscillating landing surface, and also allow transition to forward flight while maintaining constant altitude or transition to forward flight with a vertical climb.

In some implementations, stable hovering and transition to stable forward flight and back to hover is maintained by vectoring of the three rotors with servo control and rotor speed control on all three rotors. In preferred implementations, commands for servo control and speed control are provided from a suitable MEMS-sensor control board with stabilization firmware configured to operate the aircraft as set forth herein. It will be appreciated that other implementations can be provided herein that can include more than three thrusters or rotors to achieve continuous hover attitude of the aircraft.

If desired, the aircraft can also include traditional control surfaces (ailerons, rudders, elevators, elevons, and the like) to enhance control or replace some of the control from rotor thrust vectoring. For example, ailerons can be used for yaw control in a "nose-up" hovering orientation in lieu of thrust vectoring.

Thus, in some implementations, embodiments are provided of a method of operating an aircraft. The aircraft typically includes an elongate fuselage and a plurality of thrusters that are articulable with respect to the elongate fuselage. An illustrative method includes first orienting the aircraft into a horizontal hover mode of operation wherein the elongate fuselage is parallel to a stationary surface below the aircraft, or perpendicular to a gravitational vector. The method next includes transitioning the aircraft into a forward flight mode from the horizontal hover mode by adjusting orientation of at least one of said thrusters with respect to said elongate fuselage, wherein the elongate fuselage maintains its orientation with respect to the stationary surface in the forward flight mode. The method further includes transitioning the aircraft into a vertical hover mode of operation from the forward flight mode by adjusting orientation of at least one of said thrusters with respect to said elongate fuselage wherein the elongate fuselage is perpendicular to the stationary surface below the aircraft.

In some implementations, the method can further include transitioning the aircraft into the forward flight mode from the vertical hover mode of operation, wherein the elongate fuselage is horizontal to the stationary surface, (perpendicular to the gravity vector). If desired, the method can include continuously varying at least one of the pitch, yaw and roll of the aircraft to match movement of a landing surface underneath the aircraft that is experiencing motion. For example, the landing surface can be a deck of a moving ship, or a platform mounted on a moving vehicle.

In some implementations, methods can be provided of operating a VTOL aircraft that includes maintaining the elongate fuselage in an orientation parallel to ground of varying grade, or evenness, during the forward flight mode by continuously adjusting the pitch of the fuselage. If desired, the method can include transitioning a VTOL aircraft into a hover mode and aligning the elongate fuselage with a slanted landing surface, and landing the aircraft. If desired, the method can further include transitioning into a hover mode and aligning the elongate fuselage vertically, and landing the aircraft on a slanted landing surface. If desired, the method can further include transitioning into a vertical flight mode wherein the aircraft advances vertically upwardly in the vertical flight mode, and further wherein the elongate fuselage is vertically oriented in the vertical flight mode, parallel to the gravity vector. If desired, it is also contemplated to transition into the forward flight mode from the vertical flight mode. In various implementations, the method can further include adjusting the pitch, yaw, or roll of the aircraft during the forward flight mode by using at least one control surface. Alternatively, the method also contemplates adjusting the pitch, yaw, and roll of the aircraft during the forward flight mode by using only the plurality of thrusters.

The disclosure further provides an aircraft having an elongate fuselage and a plurality of thrusters that are articulable with respect to the elongate fuselage. The aircraft is configured and adapted to be controllably oriented into a horizontal hover mode of operation wherein the elongate fuselage is parallel to a stationary surface below the aircraft. The aircraft is further configured and adapted to be controllably transitioned into a forward flight mode from the horizontal hover mode by adjusting orientation of at least one of said thrusters with respect to said elongate fuselage, wherein the elongate fuselage maintains its orientation with respect to the stationary surface in the forward flight mode. The aircraft is further configured and adapted to be controllably transitioned into a vertical hover mode of operation from the forward flight mode by adjusting orientation of at least one of said thrusters with respect to said elongate fuselage wherein the elongate fuselage is perpendicular to the stationary surface below the aircraft.

In some implementations, the aircraft can include at least three articulable thrusters. Each of the articulable thrusters can be configured to articulate about at least one axis to alter the orientation of thrust produced by each respective thruster.

In some implementations, at least one of the thrusters can be configured to articulate about two axes. For example, the at least one thruster configured to articulate about two axes can be configured to articulate about a first axis that is parallel to the direction of thrust. In some implementations, the aircraft can include at least two articulable thrusters, wherein each of the articulable thrusters is configured to articulate about at two axes to alter the orientation of thrust produced by each respective thruster.

Various implementations of the aircraft also include a control system for controlling the orientation of said plurality of thrusters with said fuselage, wherein said control system includes at least one controller for receiving orientation data indicative of the physical orientation of said aircraft. The control system is configured to receive and process data indicating the shape of terrain disposed below the aircraft. In some implementations, the control system is configured to receive and process visual data indicating the shape of terrain disposed below the aircraft. The control system is also configured to process data received from at least one motion sensor to determine orientation of the aircraft and to determine any adjustments that need to be made in the orientation or speed of any of the thrusters to change the orientation of the aircraft. For example, the control system can be configured to automatically match the pitch, yaw, and roll of the aircraft to a landing surface disposed below the aircraft that may be moving (such as a naval vessel, surface vehicle or another aircraft), and land the aircraft on the landing surface.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

FIGS. 3A-3D illustrate a flight sequence of the aircraft of FIG. 1 starting in a hover mode wherein the fuselage is parallel to the ground transitioning to a forward flight mode wherein the thrusters are rotated 90 degrees with respect to the hover mode.

FIGS. 4A-4D illustrate a flight sequence of the aircraft of FIG. 1 starting in a forward flight mode and transitioning to a hover mode.

FIGS. 5A to 5D illustrate a flight sequence of the aircraft of FIG. 1 starting in a forward flight mode and transitioning to a tail sitting hover mode.

DETAILED DESCRIPTION

Figure 1A:
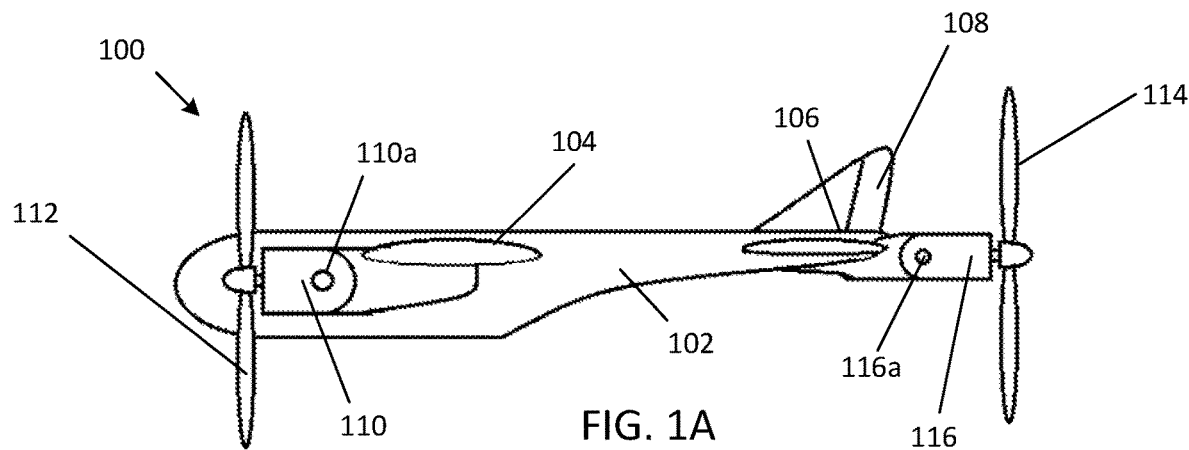
FIG. 1A is a side plan view of an illustrative aircraft in accordance with the present disclosure in a forward flight configuration.

For purposes of description herein, the terms "upper," "lower," "right," "left," "rear," "front," "vertical," "horizontal," and derivatives thereof shall relate to the invention as oriented in FIG. 3. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The presently disclosed embodiments relate to vertical takeoff and landing (VTOL) aircraft that have the capability of hovering in both a "nose forward" and a "nose up" orientation, and any orientation between those two, as well as methods and equipment for operating such vehicles. The disclosed aircraft can also transition into wing born (non-hovering) flight from any of the hovering orientations. This capability to hover in multiple orientations can be advantageous for tasks such as pointing of instruments that are in the fuselage or wing of the aircraft without the need for a gimballed instrument platform. The disclosed aircraft can also orient itself with the slope of the terrain for landings on non-horizontal surfaces. A continuously variable hover orientation also allows the flight vehicle to match its pitch oscillation movement to that of a rolling deck on a ship, thus preventing a rotor tip strike on the deck or a tip over condition on the landing gear. In addition, the disclosed aircraft can, if desired, use only vectored thrust control to maintain stable flight in both hover and forward flight. No control surfaces (e.g. ailerons, elevators, rudders, elevons, flaps, etc.) are required to maintain a stable vehicle attitude.

However, the disclosure contemplates aircraft both with and without such control surfaces.

The advantage of the disclosed embodiments over previous types of VTOL vehicles is that the orientation of the vehicle airframe can be changed in hovering mode to perform various tasks including pointing of instruments without the need for an instrument gimbal and matching of vehicle pitch and roll attitude to surfaces that may not be horizontal (e.g. mountain side) or may be changing orientation rapidly with time (e.g. a ship in rough seas or moving land vehicle). In addition the ability of the vehicle to hover in two or more orientations allows it to transition to forward flight in a number of ways that has not previously been a capability of VTOL aircraft. For example, some of the disclosed embodiments can transition from hovering into forward flight from a nose up hovering orientation by accelerating vertically and then changing orientation by 90 degrees for forward flight. This capability can be a great advantage if the vehicle is coming out of a steep-walled valley or an urban environment where horizontal distance is limited for transition to forward flight. Alternately, if the vertical distance for transitioning to hover or forward flight is constrained (such as in a tunnel or indoor environment), embodiments made in accordance with the present disclosure can maintain a constant altitude during the transition.

Embodiments made in accordance with the present disclosure can be used in a wide variety of applications including military applications, commercial agriculture, infrastructure assessment, atmospheric science, and radio controlled hobby aircraft, for example.

With the advent of high speed microprocessors combined with micro-electrical-mechanical systems to determine vehicle attitude and accelerations, Applicant has come to appreciate that controlling a VTOL flight vehicle has become easier and less costly. This has the potential to open up a new region of VTOL aircraft design space that was not previously explored, except for a few high-cost military vehicles. In addition, Applicant has come to appreciate that new electric motor and electric motor speed control (ESC) technologies for very precise motor speed control permit very precise thrust adjustment to maintain vehicle attitude control in hover and forward flight.

Figure 1B:
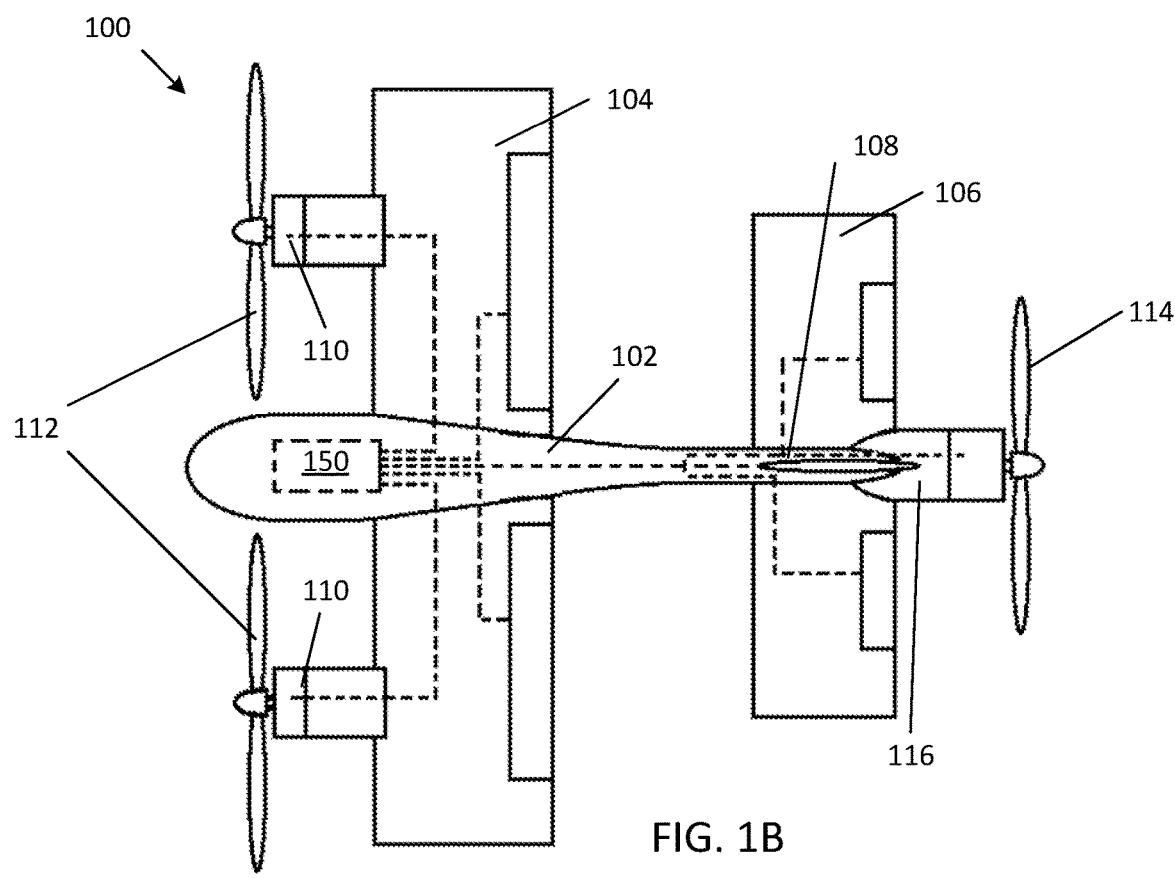
FIG. 1B is a top plan view of the aircraft of FIG. 1.

For purposes of illustration, and not limitation, as illustrated in FIGS. 1A and 1B, the disclosure further provides an aircraft, or vehicle, 100 having an elongate fuselage 102 and a plurality of thrusters disposed in nacelles 110, 116 that are articulable with respect to the elongate fuselage 102, wherein the nacelles 110, 116 are oriented in a manner to facilitate a conventional forward flight mode. Specifically, the nacelles 110, 116 can be controllably rotated about pivots 110a, 116a over a range of angular motion (e.g., about 75 degrees to about 120 degrees, more preferably about 80 degrees to about 100 degrees). The nacelles 110, 116 can be controllably actuated to rotate using suitable actuators (e.g., electric stepper motors, electric servo motors, hydraulic actuators, and the like). In the embodiment of FIG. 1A, two conventional propellers 112 are provided on the nacelles 110 mounted on the wing 104, whereas a pusher propeller 114 is mounted on the nacelle 116 near the tail 108 and the horizontal stabilizer 106.

FIG. 1B illustrates a top plan view of the aircraft 100 in forward flight mode, further illustrating a controller 150, discussed in further detail below, that is operably coupled to the control surfaces, (flaps, ailerons, elevators, elevons, rudder, etc.) as well as to the actuators (not shown) that articulate the nacelles, and the thrusters themselves for driving the propellers 112, 114. The control pathways are schematically represented in dashed lines as is the controller 150.

Figure 2A:
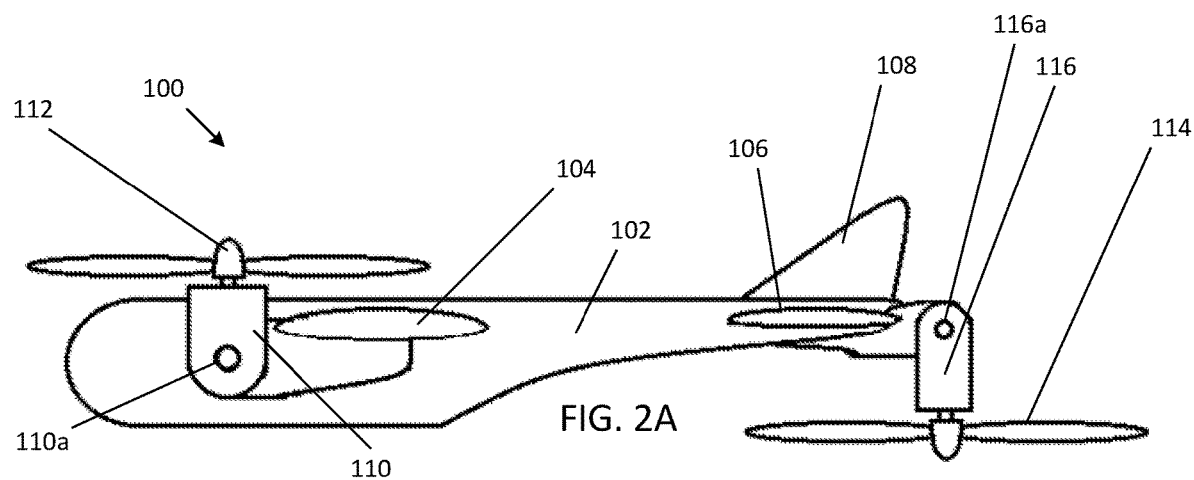
FIG. 2A is a side plan view of the aircraft of FIG. 1 in a hover mode with the fuselage of the aircraft in a horizontal orientation.
Figure 2B:
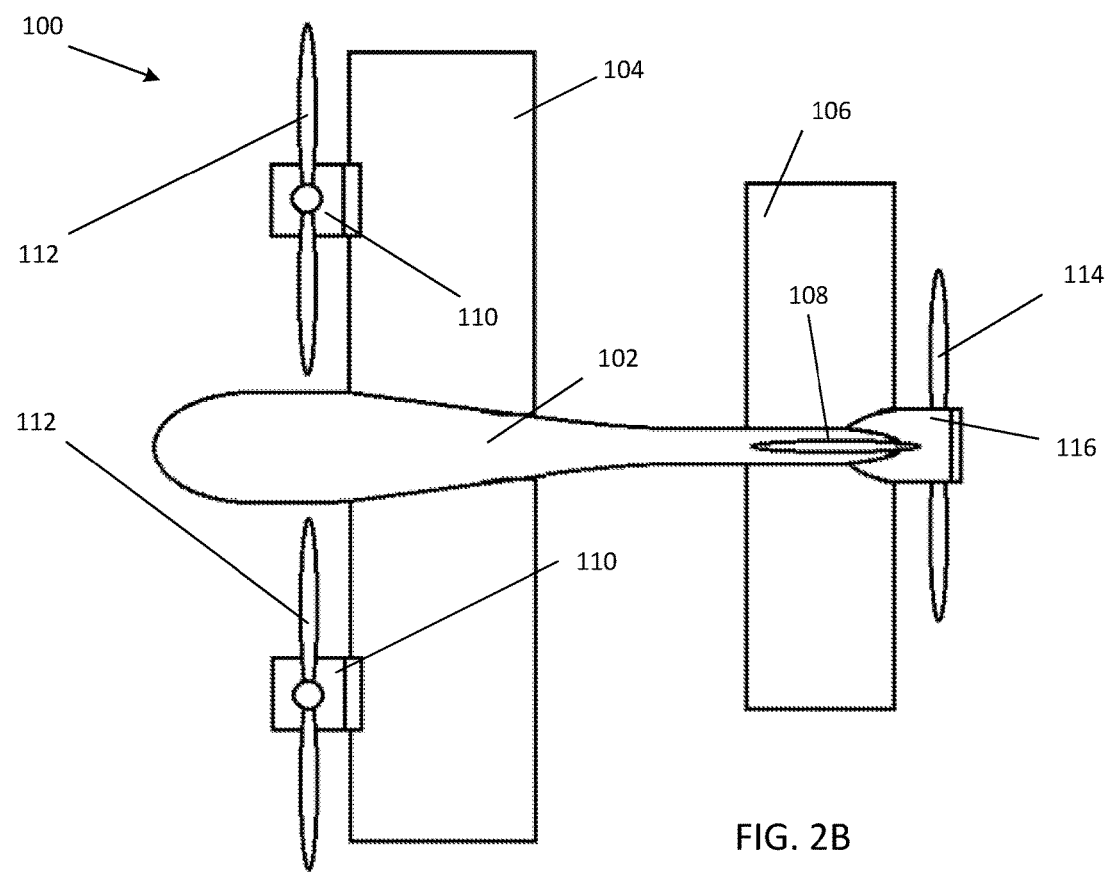
FIG. 2B is a top plan view of the aircraft of FIG. 1 in a hover mode with the fuselage of the aircraft in a horizontal orientation, wherein the propellers are displaced rotationally 90 degrees with respect to FIG. 2A for purposes of illustration.

FIGS. 2A and 2B show side plan and top plan views, respectively, of the aircraft, or vehicle, of FIG. 1A, in a horizontal hover mode. As illustrated in FIG. 2A, the nacelles 110 have been rotated about pivots 110a by about ninety degrees, wherein rotating propellers 112 pull the aircraft upwardly. Likewise, nacelle 116 has been rotated downwardly about 90 degrees in the hover mode to push up the tail section of the aircraft. The controller preferably continuously adjusts the orientation of the nacelles 110, 116 in order to maintain the fuselage 102 in a desired orientation. It will be appreciated by those of skill in the art that the elongate fuselage can have any desired shape, and may be relatively long, relatively short, wide, narrow, tall, etc. It will be appreciated that the fuselage is being referred to as being "elongate" in this disclosure in order to help describe orientation of the fuselage's "length" with respect to a coordinate system or a surface (e.g., the ground or a wall). It will be further appreciated that, while single propellers are illustrated on each nacelle 110, 116, counter-rotating propellers may alternatively be used on some or all of the nacelles. It will be still further appreciated that any desired number of nacelles may be used on the aircraft to help achieve any desired design objective.

It will be appreciated that aircraft in accordance with the disclosure can be operated in a variety of manners due to their versatility.

For example, FIGS. 3A-3D illustrate a flight sequence of the aircraft of FIG. 1 starting in a hover mode wherein the fuselage is parallel to the ground transitioning to a forward flight mode wherein the thrusters are rotated 90 degrees with respect to the hover mode. "G" in the figures enclosed within an arrow indicate the direction of the gravitational vector. As illustrated, the aircraft 100 can start from a position near the ground in FIG. 3A (or even from a landed position in which case landing gear can be present, but is not specifically illustrated). The aircraft can then simply climb in altitude and rapidly transition to forward flight as illustrate in FIG. 3D without significantly adjusting the pitch of the fuselage 102. Alternatively, the fuselage 102 can be pitched gently into a nose upward position as the nacelles 110, 116 are rotated as illustrated in FIG. 3B. As the nacelles 110, 116 continue to articulate toward a forward flight mode, the fuselage 102 begins to level as illustrated in FIG. 3C, and finally levels fully when the nacelles 110, 116 have completed their articulation. It should be noted that, to some extent, the aircraft can be caused to move forward and upwardly simultaneously, or may be maintained largely in position during transition from hover mode to forward flight mode by controlling the amount and direction of thrust provided by the propellers 112, 116.

As an alternative illustration, FIGS. 4A-4D depicts a flight sequence of the aircraft of FIG. 1 starting in a forward flight mode and transitioning to a hover mode. As indicated, the aircraft begins in forward flight mode as presented in FIG. 4A wherein the axes of rotation of the propellers are parallel to a longitudinal central axis of the fuselage 102. Then, as illustrated in FIG. 4B, the nacelles begin articulating toward their hover mode positions, and the fuselage can be permitted to tilt slightly, as desired. The nacelles continue to rotate toward hover mode as illustrated in FIG. 4C, and finally, as illustrated n FIG. 4D, the aircraft has attained hover mode. While in hover mode, the aircraft can remain stationary, move forward, backward, to the side and/or downward simultaneously. Moreover, the pitch, yaw and/or roll of the aircraft can be selectively altered by the controller to attain any desired orientation.

FIGS. 5A to 5D illustrate a flight sequence of the aircraft of FIG. 1 starting in a forward flight mode and transitioning to a tail sitting hover mode. Specifically, as illustrated in FIG. 5A, the aircraft is presented once again in a forward flight mode. As illustrated in FIGS. 5B and 5C, the nacelles 110, 116 once again begin to articulate about pivots 110a, 116a, causing the fuselage to move out of a horizontal orientation toward a vertical orientation as illustrated in FIG. 5D. Landing gear (not shown) can be provided to permit the aircraft to land on its tail. From such a landed position, or from a vertically oriented hovering position, the aircraft can then, if desired, climb rapidly with minimal aerodynamic resistance, and then maintain a hover mode, or transition into a forward flight mode.

Figures 6A, 6B, 6C:
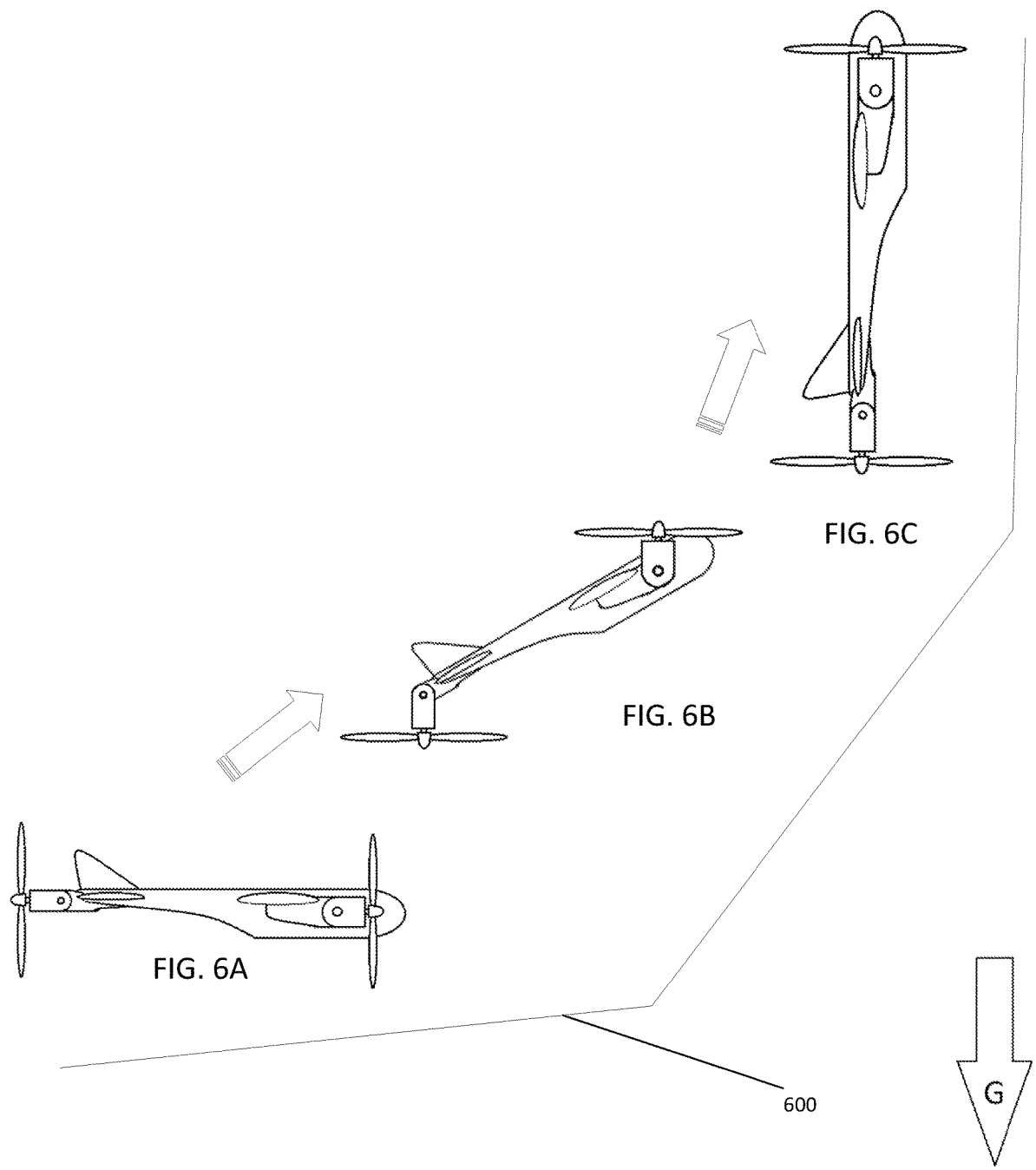
FIGS. 6A to 6C illustrate a flight sequence wherein the aircraft of FIG. 1 transitions from a forward flight mode near the ground to a vertical flight mode while hugging terrain.

FIGS. 6A to 6C illustrate a flight sequence wherein the aircraft of FIG. 1 transitions from a forward flight mode near the ground to a vertical flight mode while hugging terrain. Specifically, FIG. 6A presents the aircraft traveling forward along relatively even terrain that transitions to a vertical surface. FIG. 6B shows the nacelles 110, 116 beginning to articulate, thereby changing the pitch of the fuselage until it attains a vertical orientation as illustrated in FIG. 6C, which permits the aircraft to climb rapidly along the vertical surface. Such versatility can be of particular use when it is desired to minimize the detectability of the aircraft. This stealth can be enhanced by painting the vehicle in color(s) matching the terrain, and/or by making the aircraft from materials that provide a minimal radar signature.

Figure 7A:
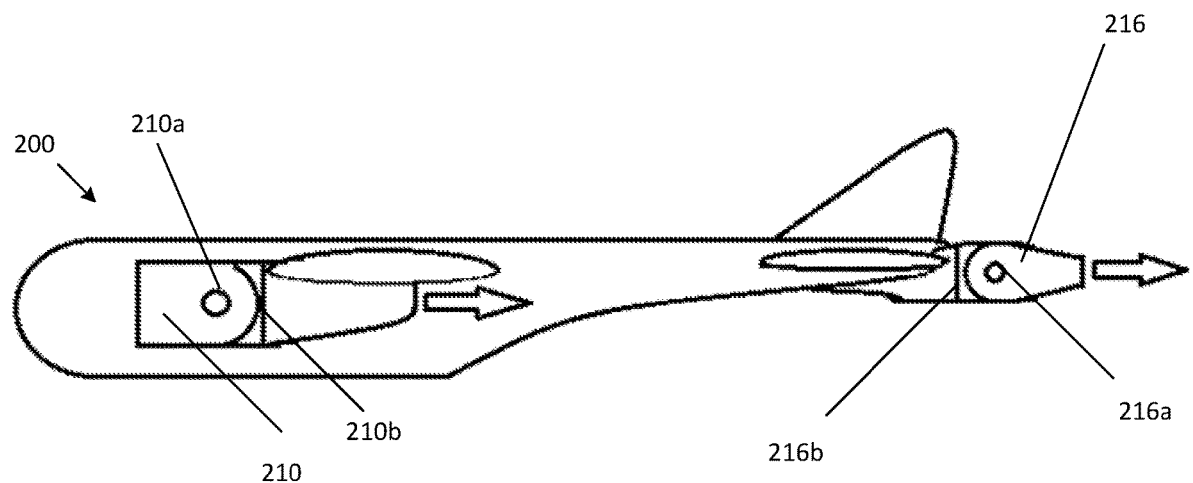
FIGS. 7A and 7B are side plan views of an alternate embodiment of an aircraft in accordance with the disclosure that utilizes jet or ducted fan thrusters in place of propeller based thrusters.
Figure 7B:
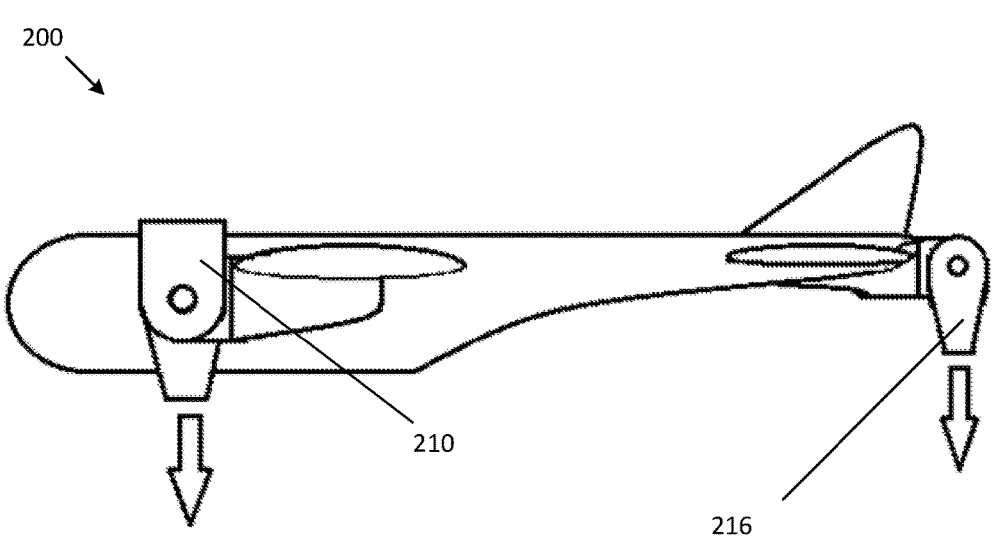

FIGS. 7A and 7B are side plan views of an alternate embodiment 200 of an aircraft in accordance with the disclosure that utilizes jet or ducted fan thrusters in place of propeller based thrusters. The nacelles 210, 216 articulate about pivots 210a, 216a to transition from a forward flight mode into a horizontal hover mode, and/or into a vertical hover or flight mode, as desired. It is also contemplated to provide the nacelles 210, 216 with a further capability to pivot the nacelles about an axis that is parallel to a longitudinal axis of the fuselage in planes of rotation 210b, 216b. Stated another way, the engines themselves can be rotatably mounted within nacelles 210, 216 and be articulable by the controller, such as by one or more geared stepper motors that engage an arcuate rack mounted on the engine (not shown). This permits the thrusters to be vectored from side to side when in the horizontal hover mode illustrated in FIG. 7B to help the aircraft translate sideways, or to permit it to rotate in place horizontally about a vertical axis that is orthogonal to a longitudinal axis of the fuselage.

Figure 8A:
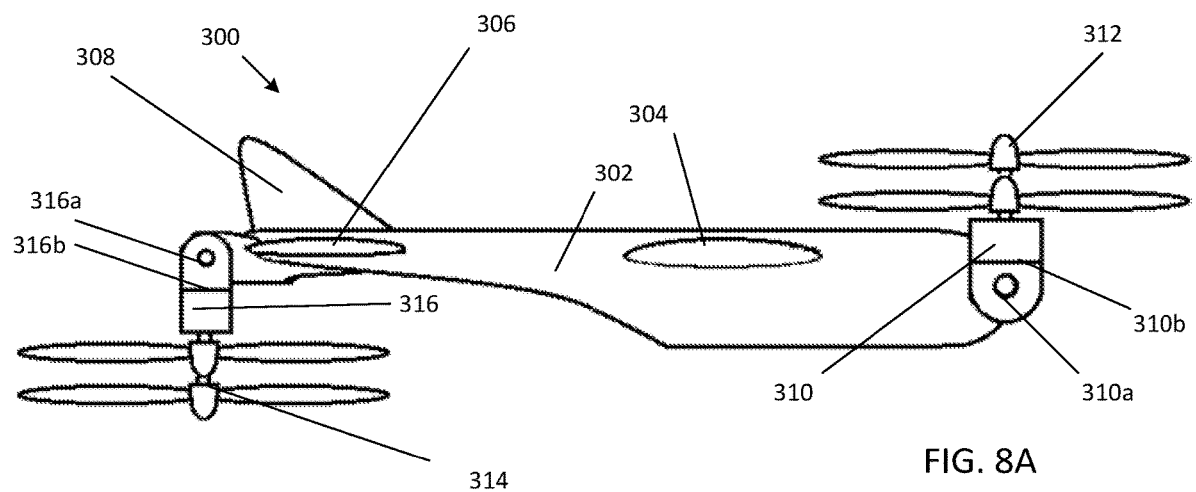
FIGS. 8A and 8B are top plan and side plan views, respectively, of an alternate embodiment of an aircraft in accordance with the disclosure that utilizes two thrusters that can articulate about two orthogonal axes in a hover mode.
Figure 8B:
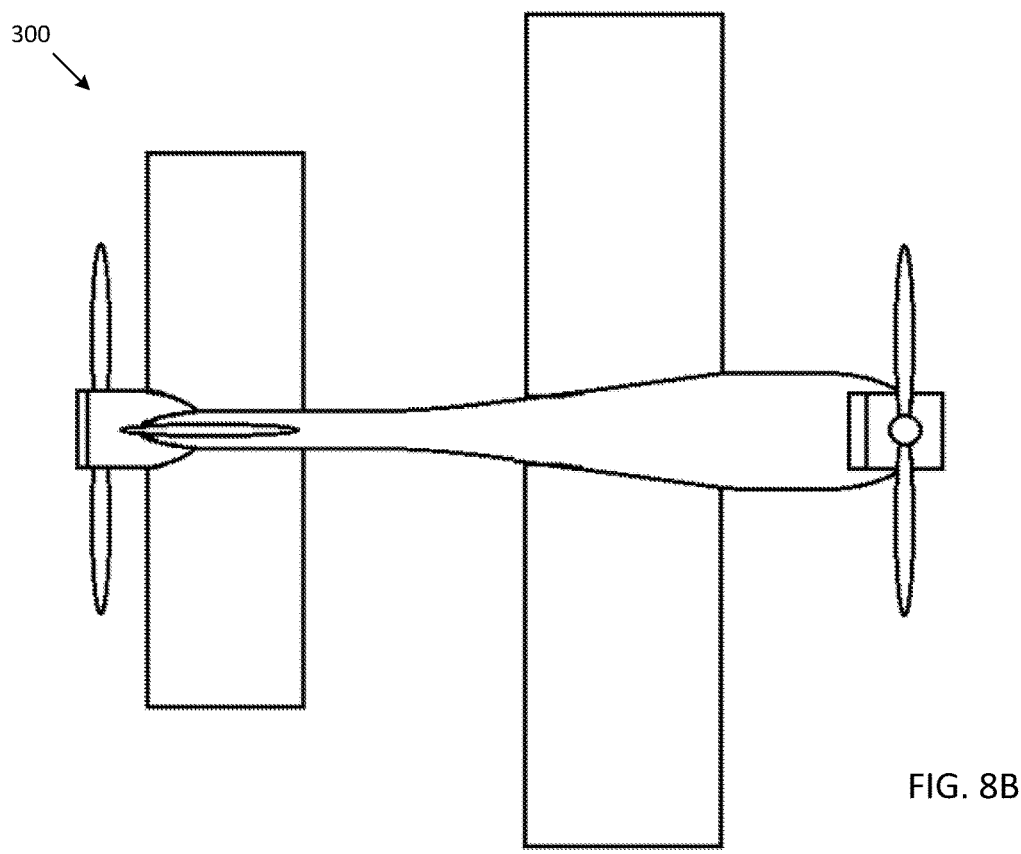
Figure 9A:
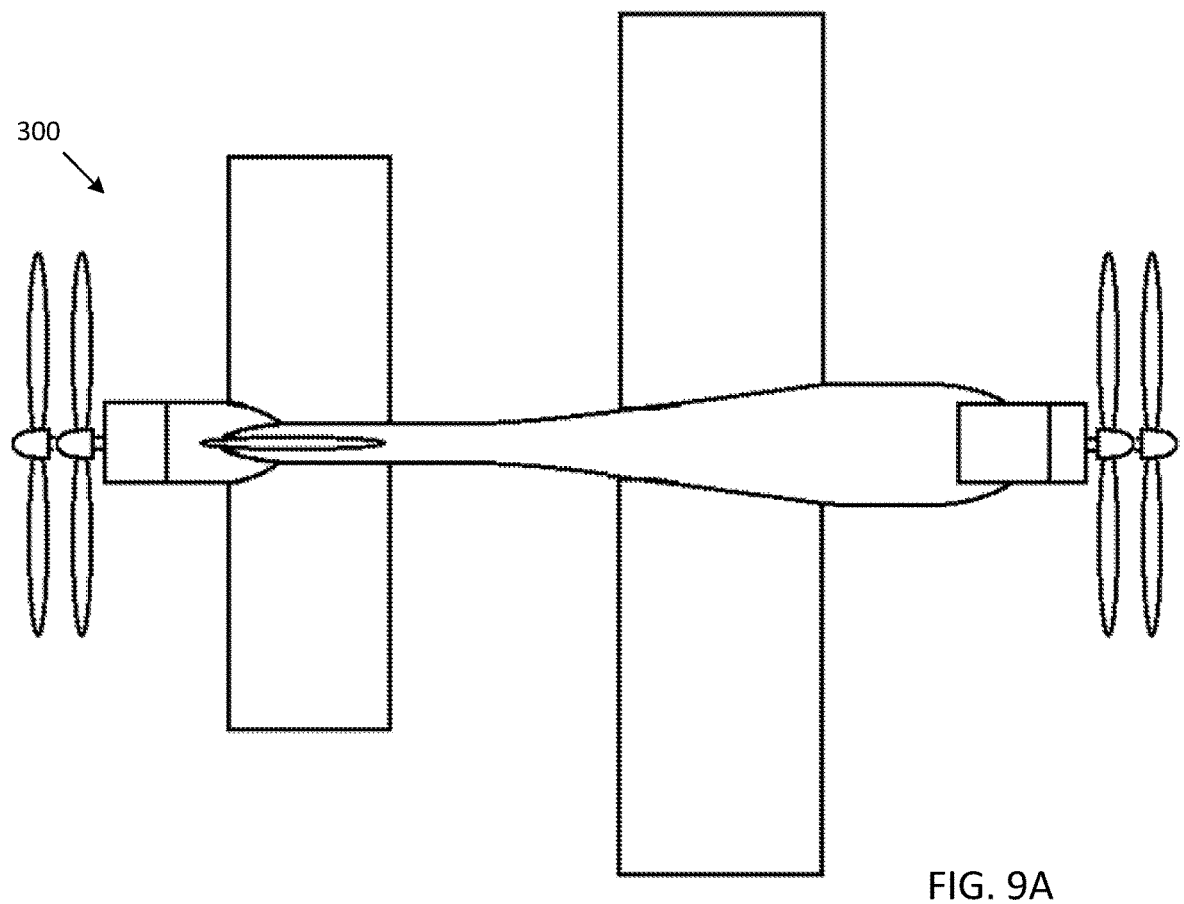
FIGS. 9A and 9B are top plan and side plan views, respectively, of the embodiment of FIGS. 8A and 8B in a forward flight mode configuration.
Figure 9B:
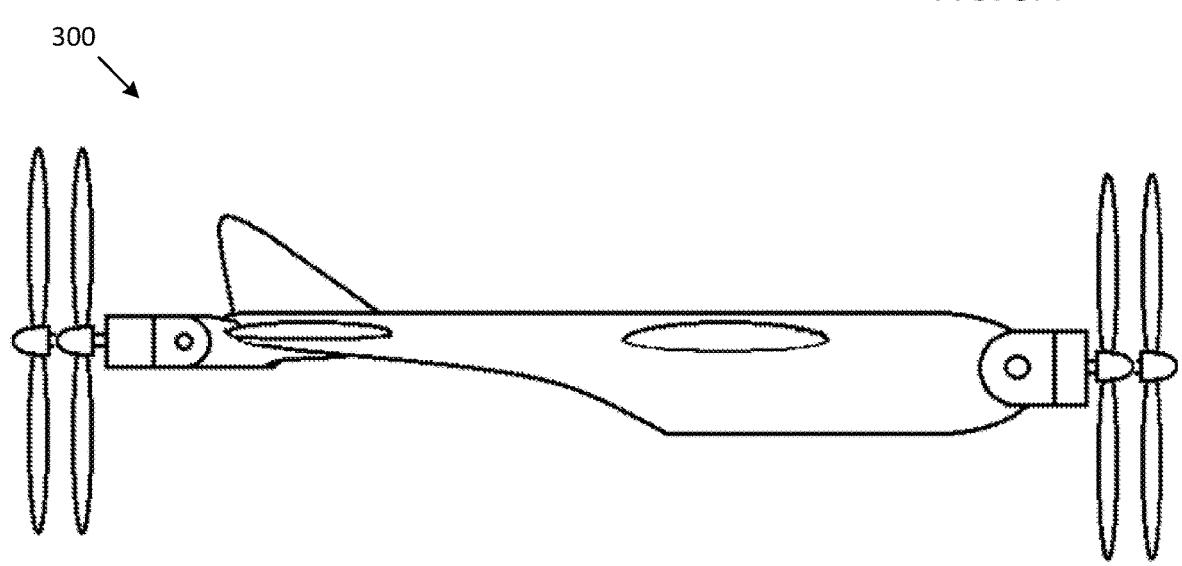

In further accordance with the disclosure, FIGS. 8A and 8B are top plan and side plan views, respectively, of an alternate embodiment of an aircraft 300 in accordance with the disclosure that utilizes two thrusters, mounted in nacelles 310, 316, that can articulate about two orthogonal axes while in a hover mode. FIGS. 9A and 9B are top plan and side plan views, respectively, of the embodiment of FIGS. 8A and 8B in a forward flight mode configuration. The portions of aircraft 300 are similar to those of FIG. 1. For example, fuselage 302 includes a wing 304, a horizontal stabilizer 306, and tail 308 with a rudder, if desired (not shown).

A first nacelle 310 is located on the nose of the aircraft, and a second nacelle 316 is located on a tail of the aircraft. The tail nacelle 316 is articulable about a pivot 316a as the previous embodiments. Also, a secondary pivot plane 316b (oriented into and out of the page of FIG. 8A) is provided as with the embodiment of FIGS. 7A and 7B, such that the nacelle 316 can be controllably pivoted about the axis of counter-rotating propellers 314 at the location of plane 316b. Similarly, the nacelle 310 mounted in the nose of the aircraft is articulable about pivot 310a, and about the axes of rotation of the counter-rotating propeller pairs 312, 314 at the location of plane 310b. Counter-rotating propellers 312, 314 are preferably used that are configured to impart a minimal net torque to the fuselage 302 of aircraft 300. The axes of propellers 312, 314 can be along the same axis, or their axes can be offset and be parallel to each other when the nacelles are oriented in the forward flight mode as illustrated in FIGS. 9A and 9B. Thus, in the implementation of FIGS. 8A-(b, both of the thrusters can be configured to articulate about two axes—the axes of pivots 310a, 316a, and the axes of the propellers 312, 314 in order to control the roll of the aircraft. The controller (e.g., 150) can be configured to control all movements of the nacelles and the motors, as well as the control surfaces, if so equipped.

As to the second axis of rotation of each nacelle to control roll, the axis of rotation may be coaxial with the axis of rotation of the propellers on each nacelle, or the axes of rotation of the nacelle to control roll may be displaced (e.g., vertically) from the axis of rotation of the propeller. The center of gravity of the aircraft should be below or above the line of action of the second axis of rotation to ensure that roll torque is achieved.

As mentioned above with reference to FIG. 1, various implementations of the aircraft also include a controller 150 for controlling the orientation of the thrusters with respect to the fuselage. Preferably, the controller 150 is also configured to receive orientation data indicative of the physical orientation of the aircraft (e.g., 100, 200, 300), such as from motion sensors (not shown) disposed in the fuselage and/or the nacelles. The controller 150 is also preferably configured to receive and process data indicating the shape of terrain disposed below the aircraft. In some implementations, the control system 150 is configured to receive and process visual data indicating the shape of terrain disposed below the aircraft. The visual data can be in the visible spectrum as well as other spectrums (e.g., infrared and other spectrums). The controller 150 is also preferably configured to determine any adjustments that need to be made in the orientation or speed of any of the thrusters (whether propeller, jet or fan driven) to change the orientation of the aircraft. For example, the controller can be configured to automatically match the pitch, yaw, and roll of the aircraft to a landing surface disposed below the aircraft that may be moving (such as a naval vessel, surface vehicle or another aircraft), and land the aircraft on the landing surface. As will be appreciated, controller 150 can control the speed and orientation of each thruster independently of one another. A power supply, such as a battery (not shown) is also provided for powering the vehicle.

Various embodiments of a controller 150 can be used. In preferred implementations, commands for servo control and speed control are provided from a suitable MEMS-sensor control board with stabilization software that is specifically configured to operate the aircraft as set forth herein. In one example, an experimental scale aircraft having the structural configuration set forth in FIG. 1A was constructed utilizing a Hobbyking KK2.1.5 Multi-rotor LCD Flight Control Board With 6050MPU And Atmel 644PA. A servo controlling the motion of each nacelle 110, 110, 116 was connected to the board as well as to each of three electric thruster motors located in the nacelles. A reconfigurable code run on the control board was used that was modified to mix the hover flight control settings with the forward flight control settings in a predetermined ratio in order to achieve a desired fuselage hover angle. In this particular example, settings for a "second" hover orientation were used as the forward flight mode settings. It will be appreciated, however that any suitable controller can be used, with suitably configured, or custom coded control software to help produce aircraft in accordance with the present disclosure.

As discussed above, the disclosed embodiments of aircraft are configured to be extremely versatile. Aircraft in accordance with the present disclosure can be configured to take off from and/or land on moving surfaces, such as those of naval vessels, surface vehicles, and, if desired, onto other aircraft.

Though aspects and features may in some cases be described in individual figures, it will be appreciated that features from one figure can be combined with features of another figure even though the combination is not explicitly shown or explicitly described as a combination. It is intended that the specification and drawings be considered as examples only, with a true scope of the invention being indicated by the following claims.

What is claimed is:

1. A non-transitory computer-readable medium comprising computer-executable instructions that when executed by a processor, cause the processor to at least:
   generate a horizontal hover mode control signal configured to orient an aircraft having an elongate fuselage and a plurality of thrusters that are articulable with respect to the elongate fuselage into a horizontal hover mode of operation, wherein the horizontal hover mode control signal is configured to cause the elongate fuselage to be parallel to a stationary surface below the aircraft;
   generate a forward flight mode control signal configured to transition the aircraft into a forward flight mode from the horizontal hover mode, the forward flight control signal configured to at least adjust orientation of at least one of said thrusters with respect to said elongate fuselage, wherein the elongate fuselage maintains its orientation with respect to the stationary surface in the forward flight mode; and
   generate a vertical hover mode control signal configured to transition the aircraft into a vertical hover mode of operation from the forward flight mode, the vertical hover mode control signal configured to at least adjust orientation of at least one of said thrusters with respect to said elongate fuselage wherein the elongate fuselage is perpendicular to the stationary surface below the aircraft.

2. The non-transitory computer-readable medium of claim 1, the medium further comprising instructions that when executed by the processor, cause to the processor to at least:
   generate a second forward flight mode signal configured to transition the aircraft into a forward flight mode from the vertical hover mode of operation, wherein the elongate fuselage is horizontal to the stationary surface.

3. The non-transitory computer-readable medium of claim 1, the medium further comprising instructions that when executed by the processor, cause to the processor to at least:
   receive movement data comprising electronic information relating to movement of a landing surface; and
   in response to at least the received movement data, transmit a signal configured to continuously vary at least one of the pitch, yaw and roll of the aircraft to match movement of a landing surface underneath the aircraft that is experiencing motion.

4. The non-transitory computer-readable medium of claim 3, wherein the movement data comprising data relating to the movement of a vessel over water.

5. The non-transitory computer-readable medium of claim 1, the medium further comprising instructions that when executed by the processor, cause to the processor to at least:
   generate a maintain control signal configured to be transmitted while the aircraft is in forward flight mode, the control signal configured to maintain the elongate fuselage in an orientation parallel to a ground surface of varying evenness by continuously adjusting the pitch of the fuselage.

6. The non-transitory computer-readable medium of claim 1, the medium further comprising instructions that when executed by the processor, cause to the processor to at least:
   generate a landing control signal configured to transition the aircraft into a hover mode, align the elongate fuselage with a slanted landing surface, and land the aircraft on the slanted landing surface.

7. The non-transitory computer-readable medium of claim 1, the medium further comprising instructions that when executed by the processor, cause to the processor to at least:
   generate a landing control signal configured to transition the aircraft into a hover mode, align the elongate fuselage vertically, and land the aircraft on a slanted landing surface.

8. The non-transitory computer-readable medium of claim 1, the medium further comprising instructions that when executed by the processor, cause to the processor to at least:
   adjust the pitch, yaw, or roll of the aircraft during the forward flight mode by using at least one control surface.

9. The non-transitory computer-readable medium of claim 1, the medium further comprising instructions that when executed by the processor, cause to the processor to at least:
   adjust the pitch, yaw, and roll of the aircraft during the forward flight mode by using only the plurality of thrusters.

* * * * *